(12) United States Patent
Hamada

(10) Patent No.: US 8,355,096 B2
(45) Date of Patent: Jan. 15, 2013

(54) ILLUMINATION DEVICE AND LIQUID CRYSTAL DISPLAY DEVICE INCLUDING THE SAME

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 142 days.

(21) Appl. No.: 13/003,880

(22) PCT Filed: Jun. 3, 2009

(86) PCT No.: PCT/JP2009/060145
§ 371 (c)(1),
(2), (4) Date: Jan. 13, 2011

(87) PCT Pub. No.: WO2010/016322
PCT Pub. Date: Feb. 11, 2010

(65) Prior Publication Data
US 2011/0122339 A1    May 26, 2011

(30) Foreign Application Priority Data
Aug. 4, 2008   (JP) .................................. 2008-200436

(51) Int. Cl.
*G02F 1/13357* (2006.01)
(52) U.S. Cl. ............ 349/65; 349/58; 362/97.3; 362/612
(58) Field of Classification Search .................. None
See application file for complete search history.

(56) References Cited

U.S. PATENT DOCUMENTS

| | | | |
|---|---|---|---|
| 7,894,016 B2 * | 2/2011 | Hamada | 349/58 |
| 2006/0114694 A1 * | 6/2006 | Cho et al. | 362/631 |
| 2007/0008457 A1 * | 1/2007 | Takahashi et al. | 349/64 |
| 2007/0247870 A1 | 10/2007 | Sakai et al. | |
| 2008/0074902 A1 * | 3/2008 | Oh et al. | 362/612 |
| 2009/0066877 A1 * | 3/2009 | Abe et al. | 349/62 |
| 2011/0025942 A1 * | 2/2011 | Lee | 349/58 |
| 2011/0116011 A1 * | 5/2011 | Isobe et al. | 349/62 |

FOREIGN PATENT DOCUMENTS

| | | | |
|---|---|---|---|
| JP | 2004-233810 A | * | 8/2004 |
| JP | 2005-135862 A | | 5/2005 |
| JP | 2005-235560 A | | 9/2005 |
| JP | 2007-311327 A | | 11/2007 |

OTHER PUBLICATIONS

Official Communication issued in International Patent Application No. PCT/JP2009/060145, mailed on Sep. 8, 2009.

* cited by examiner

*Primary Examiner* — Mike Stahl
(74) *Attorney, Agent, or Firm* — Keating & Bennett, LLP

(57) ABSTRACT

An illumination device that can reduce variations in brightness is provided. This illumination device (10) includes a light source module (5) and a chassis (1) provided with an accommodation space (10*a*). A light guide plate placement portion (1*a*) and a light source placement portion (1*b*) are provided in the accommodation space (10*a*). The light source placement portion (1*b*) has a placement surface (1*c*), the placement surface (1*c*) is formed such that the placement surface (1*c*) is raised with respect to the light source placement portion (1*b*) and the light source module (5) is placed on the placement surface (1*c*).

6 Claims, 6 Drawing Sheets

ILLUMINATION DEVICE AND LIQUID CRYSTAL DISPLAY DEVICE INCLUDING THE SAME

TECHNICAL FIELD

The present invention relates to an illumination device and a liquid crystal display device including such an illumination device.

BACKGROUND ART

Conventionally, an illumination device that can emit planar light is known, and is utilized as a backlight unit for illuminating a liquid crystal display panel in a liquid crystal display device. As this type of illumination device for a liquid crystal display device, there are a direct-lit illumination device, a side-lit illumination device and the like.

The direct-lit illumination device refers to an illumination device in which a light source is arranged directly below a liquid crystal display panel. On the other hand, the side-lit illumination device refers to an illumination device in which a light guide plate is arranged directly below a liquid crystal display panel and in which a light source is arranged to face a predetermined side end surface of the light guide plate (for example, see patent document 1). In this side-lit illumination device, light is emitted from the light source, and then the light is introduced into the light guide plate through the predetermined side end surface of the light guide plate. Then, the light introduced into the light guide plate becomes planar light, and the planar light illuminates the liquid crystal display panel.

FIG. 7 is a simplified view of an example of a conventional side-lit illumination device. With reference to FIG. 7, in the conventional side-lit illumination device, a plurality of light emitting diode elements (LEDs) 101 are used as a light source. The LEDs 101 serving as the light source are combined into a module by being mounted on the same flexible printed circuit wiring board (FPC) 102.

A light guide plate 103 that converts light from the LEDs 101 into planar light is formed with a transparent plate-shaped member having four side end surfaces and front and back surfaces perpendicular to the four side end surfaces. A predetermined side end surface of the four side end surfaces of the light guide plate 103 is a surface that the LEDs 101 are arranged to face and that functions as an light entrance surface through which the light from the LEDs 101 is introduced into the light guide plate 103. The front surface of the light guide plate 103 is a surface that faces a liquid crystal display panel (not shown) and that functions as a light emitting surface through which the light introduced into the light guide plate 103 is emitted as planar light toward the liquid crystal display panel. Part of the FPC 102 (where the LEDs 101 are not mounted) is bonded to the back surface of the light guide plate 103, and thus the LEDs 101 are fixed to the light guide plate 103.

RELATED ART DOCUMENT

Patent Document

Patent document 1: JP-A-2005-235560

DISCLOSURE OF THE INVENTION

Problems to be Solved by the Invention

When a liquid crystal display device in which the conventional illumination device described above is installed is intended for industrial applications, the light guide plate 103 is more likely to, for example, warp due to heat around the liquid crystal display device, and thus its display quality is disadvantageously degraded. Hence, in this case, in order for the occurrence of the warp or the like of the light guide plate 103 to be reduced, the thickness of the light guide plate 103 is often increased.

However, in the conventional illumination device described above, when the thickness of the light guide plate 103 is increased, as shown in FIG. 8, the LEDs 101 are arranged at an end of the light guide plate 103 in the plate thickness direction of the light guide plate 103, and thus variations in brightness and the resulting stripes are more likely to occur disadvantageously. Arrows L shown in FIG. 8 represent the behavior of the light. Regions 110a shown in FIG. 8 are dimly-lit regions; a region 110b shown in FIG. 8 is a brightly-lit region.

The present invention is designed to overcome the forgoing disadvantage; an object of the present invention is to provide an illumination device that can reduce variations in brightness and a liquid crystal device including such an illumination device.

Means for Solving the Problem

To achieve the above object, an illumination device according to a first aspect of the present invention includes: a light guide plate having at least a light entrance surface that is a predetermined side end surface and a light emitting surface that is perpendicular to the light entrance surface and that is a surface facing a member to be illuminated; a light source module including at least a light emitting diode element arranged to face the light entrance surface of the light guide plate; and a chassis having an accommodation space for accommodating the light guide plate and the light source module. In the illumination device, a first placement portion on which the light guide plate is placed and a second placement portion on which the light source module is placed are provided in the accommodation space, the first and second placement portions are formed such that the second placement portion has a placement surface perpendicular to the light entrance surface of the light guide plated and that the placement surface of the second placement portion is raised in a plate thickness direction of the light guide plate with respect to the first placement portion, and the light source module is placed on the placement surface of the second placement portion.

With the illumination device according to the first aspect and configured as described above, since the light emitting diode element included in the light source module is raised in the plate thickness direction of the light guide plate, it is possible to move the light emitting diode element to the center of the light guide plate in the plate thickness direction of the light guide plate. Thus, it is possible to reduce variations in brightness resulting from the light emitting diode element being arranged at an end of the light guide plate in the plate thickness direction of the light guide plate.

Preferably, in the illumination device according to the first aspect, when the light source module is placed on the placement surface of the second placement portion, the amount of raising of the placement surface of the second placement portion is set such that the light emitting diode element is moved close to the center of the light guide plate in the plate thickness direction of the light guide plate. With this configuration, it is possible to reduce variations in brightness.

Preferably, in the illumination device according to the first aspect, at least the second placement portion is formed of metal. With this configuration, it is possible to efficiently dissipate heat from the light emitting diode element.

Preferably, in the illumination device according to the first aspect, a part of the chassis is the first placement portion, and a predetermined portion other than the part of the chassis that is the first placement portion is the second placement portion. With this configuration, since it is not necessary to additionally provide a raising member for raising the light emitting diode element, it is possible to prevent the cost from being increased resulting from the number of components being increased. Since it is not necessary to interpose the raising member between the chassis and the light source module, it is possible to efficiently dissipate heat from the light emitting diode element.

In this case, the predetermined portion integrally extending from the first placement portion of the chassis may protrude such that the predetermined portion is arranged in a region opposite the light entrance surface of the light guide plate, and the protruding predetermined portion of the chassis may be the second placement portion. With this configuration, it is possible to easily obtain the chassis in which the placement surface of the second placement portion is raised.

In this case, the predetermined portion integrally extending from the first placement portion of the chassis may be folded such that the predetermined portion is arranged in a region opposite the light entrance surface of the light guide plate, and the folded predetermined portion of the chassis may be the second placement portion. With this configuration, it is possible to easily obtain the chassis in which the placement surface of the second placement portion is raised.

Preferably, when the folded predetermined portion of the chassis is the second placement portion, an end of the folded predetermined portion of the chassis is extended very close to the light entrance surface of the light guide plate. With this configuration, the end of the second placement portion of the chassis positioned on the side of the light guide plate is arranged very close to the light entrance surface of the light guide plate. Thus, it is possible to bring the light source module placed on the placement surface of the second placement portion of the chassis close to the light entrance surface of the light guide plate. In other words, it is possible to decrease a space between the light emitting diode element and the light entrance surface of the light guide plate. Since the amount of light incident on the light entrance surface of the light guide plate is increased in this way, it is possible to enhance the efficiency with which the light is utilized. Moreover, when the light source module is placed on the placement surface of the second placement portion of the chassis, the end of the second placement portion of the chassis is used as a position reference, and thus it is possible to easily place the light source module in position.

In the illumination device according to the first aspect, a part of the chassis may be the first placement portion, and the second placement portion may be attached afterward to the chassis having the first placement portion.

A liquid crystal display device according to a second aspect of the present invention includes the illumination device according to the first aspect and a liquid crystal display panel to which light from the illumination device is applied. With this configuration it is possible to easily reduce variations in brightness and the resulting stripes.

Advantages of the Invention

As described above, according to the present invention, it is possible to easily obtain an illumination device that can reduce variations in brightness and a liquid crystal device including such an illumination device.

BEST MODE FOR CARRYING OUT THE INVENTION

First Embodiment

The configuration of an illumination device 10 of a first embodiment will first be described with reference to FIGS. 1 to 3.

Figure 1:
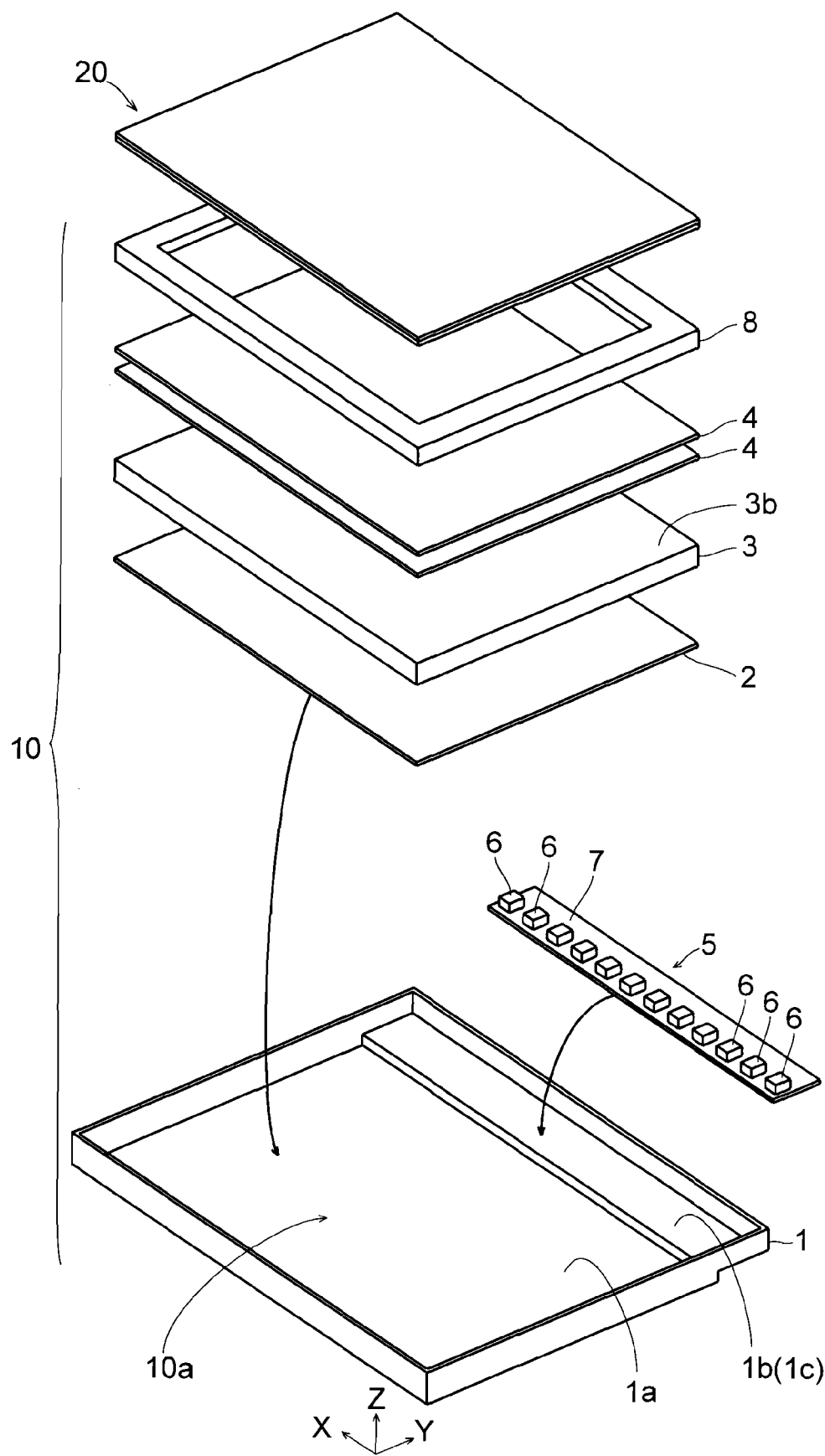
FIG. 1 An exploded perspective view of an illumination device according to a first embodiment of the present invention.

As shown in FIG. 1, the illumination device 10 of the first embodiment is used as a backlight unit installed in a liquid crystal display device; the illumination device 10 generates planar light and applies it through the back surface of a liquid crystal display panel (member to be illuminated) 20 to the liquid crystal display panel 20. The illumination device 10 of the first embodiment is installed in, for example, a liquid crystal display device for industrial applications.

Figure 2:
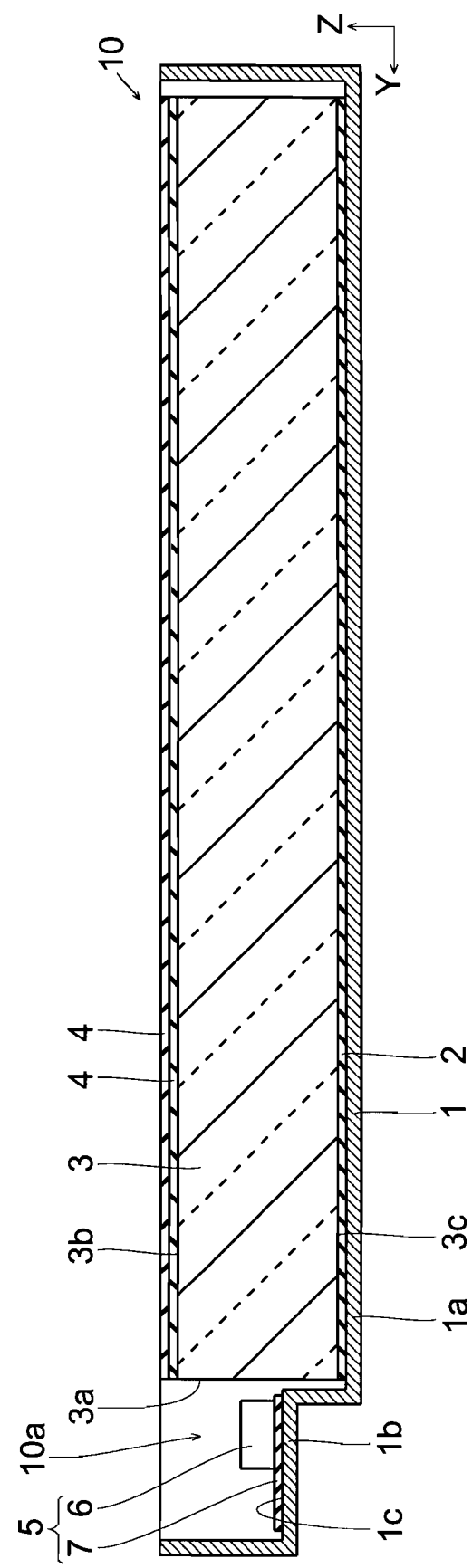
FIG. 2 A cross-sectional view of the illumination device of the first embodiment shown in FIG. 1.
Figure 3:
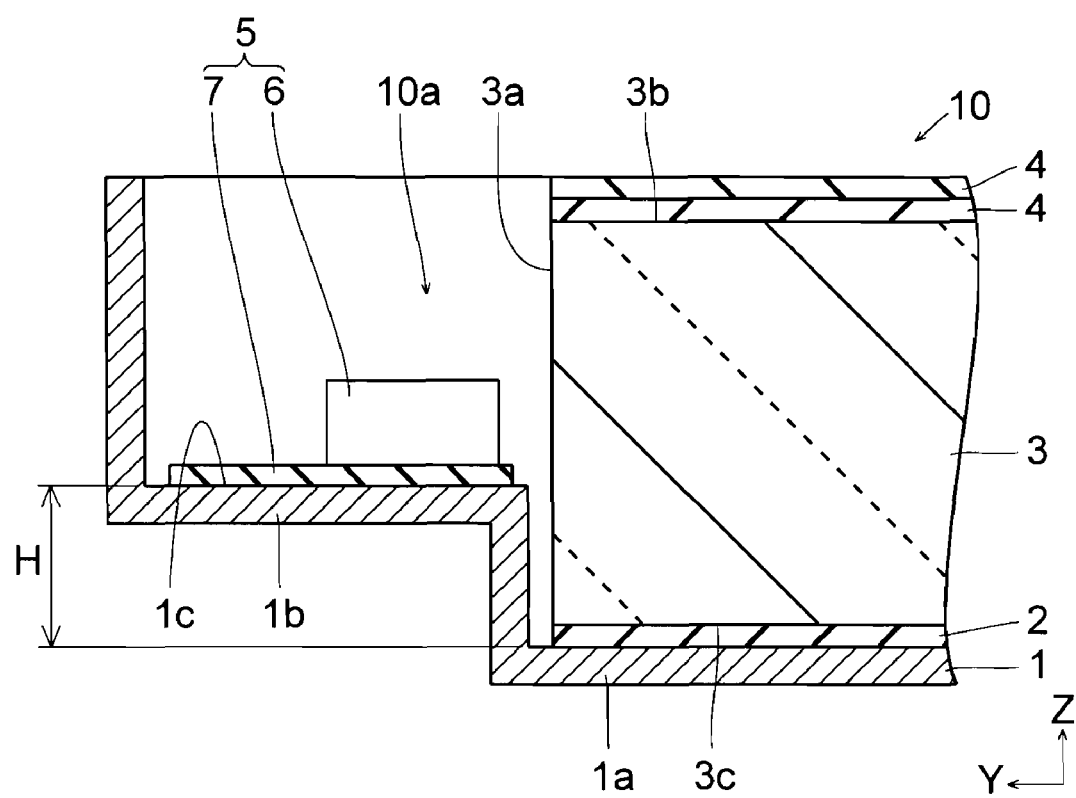
FIG. 3 An enlarged view of a light source module and its vicinity of the illumination device of the first embodiment shown in FIG. 1.

As shown in FIGS. 1 to 3, the illumination device 10 is a side-lit illumination device and is provided with at least a chassis 1, a reflective sheet 2, a light guide plate 3, optical sheets 4 and a light source module 5. The reflective sheet 2, the light guide plate 3, the optical sheets 4 and the light source module 5 are mounted on the chassis 1.

The chassis 1 is formed with a metal plate (for example, an aluminum plate or a stainless steel plate) such that the chassis 1 has an opening on the side of the liquid crystal display panel 20. In other words, the chassis 1 has a bottom portion and a side portion that is provided to stand on the perimeter portion of the bottom portion. A region on the bottom portion of the chassis 1 is an accommodation space 10*a* where the reflective sheet 2, the light guide plate 3, the optical sheets 4 and the light source module 5 are accommodated.

The reflective sheet 2 is placed on a part 1*a* of the bottom portion of the chassis 1, and covers the back surface 3*c*, to be described later, of the light guide plate 3. When this type of reflective sheet 2 is provided, even if light leaks through the back surface 3*c* of the light guide plate 3, the light is reflected off the reflective sheet 2, and thus it is possible to reintroduce into the light guide plate 3 the light that has leaked through the back surface 3*c* of the light guide plate 3.

The light guide plate 3 guides light from light emitting diode elements (LEDs) 6 to be described later toward the liquid crystal display panel 20, and is placed on the reflective sheet 2. In other words, the light guide plate 3 is placed on the part 1a of the bottom portion of the chassis 1 through the reflective sheet 2. The part 1a of the chassis 1 on which the light guide plate 3 is placed is an example of a "first placement portion" of the present invention; in the following description, it is referred to as a light guide plate placement portion 1a.

The light guide plate 3 is formed with a transparent resin plate-shaped member, and has four side end surfaces including a predetermined side end surface 3a that the LEDs 6 are arranged to face and the front surface 3b and the back surface 3c joining the four side end surfaces. The predetermined side end surface 3a of the light guide plate 3 functions as a light entrance surface through which the light from the LEDs 6 are introduced into the light guide plate 3. The front surface 3b of the light guide plate 3 is perpendicular to the predetermined side end surface 3a of the light guide plate 3, faces the liquid crystal display panel 20 and functions as a light emitting surface through which the light introduced into the light guide plate 3 is emitted as planar light toward the liquid crystal display panel 20. In the following description, the predetermined side end surface 3a of the light guide plate 3 is referred to as a light entrance surface 3a, and the front surface 3b of the light guide plate 3 is referred to as a light emitting surface 3b.

The optical sheets 4 include a diffusion sheet and a prism sheet, and are placed on the light emitting surface 3b of the light guide plate 3. The optical sheets 4 are used to, for example, diffuse and collect the light emitted through the light emitting surface 3b of the light guide plate 3.

The light source module 5 includes a plurality of LEDs 6 and a flexible printed circuit wiring board (FPC) 7 on which the LEDs 6 are mounted. The LEDs 6 mounted on the FPC 7 are spaced a predetermined distance away from each other in an X-direction (direction along the light entrance surface 3a of the light guide plate 3) such that the LEDs 6 face the light entrance surface 3a of the light guide plate 3.

Here, in the first embodiment, a predetermined portion adjacent to the light guide plate placement portion 1a of the bottom portion of the chassis 1 in a Y-direction (direction perpendicular to the direction in which the LEDs 6 are arranged) is a light source placement portion 1b, and the light source module 5 is fixed to the light source placement portion 1b of the chassis 1. That is, in the first embodiment, the light source module 5 is not bonded to the back surface 3c of the light guide plate 3. The light source placement portion 1b of the chassis 1 is an example of a "second placement portion" of the present invention.

This light source placement portion 1b of the chassis 1 is formed such that the light source placement portion 1b has a placement surface 1c perpendicular to the light entrance surface 3a of the light guide plate 3, and that the placement surface 1c of the light source placement portion 1b is raised in a Z-direction (the plate thickness direction of the light guide plate 3) with respect to the light guide plate placement portion 1a. Specifically, a predetermined portion integrally extending from the light guide plate placement portion 1a of the chassis 1 protrudes in the Z-direction such that the predetermined portion is arranged in a region opposite the light entrance surface 3a of the light guide plate 3; the protruding predetermined portion of the chassis 1 is the light source placement portion 1b. The light source module 5 is placed on the placement surface 1c of the light source placement portion 1b of the chassis 1.

In the first embodiment, when the light source module 5 is placed on the placement surface 1c of the light source placement portion 1b of the chassis 1, the amount (the height of the protruding portion) H of raising of the placement surface 1c of the light source placement portion 1b of the chassis 1 is set such that the LEDs 6 are moved close to the center of the light guide plate 3 in the plate thickness direction of the light guide plate 3. Hence, when the light source module 5 is placed on the placement surface 1c of the light source placement portion 1b of the chassis 1, the LEDs 6 face the vicinity of the center of the light entrance surface 3a of the light guide plate 3 in the Z-direction.

As shown in FIG. 1, with the reflective sheet 2, the light guide plate 3, the optical sheets 4 and the light source module 5 placed on the bottom portion of the chassis 1, a frame 8 formed in the shape of a frame is fitted to the opening of the chassis 1. A frame portion of the frame 8 presses the optical sheets 4 from above.

In the first embodiment, as described above, the predetermined portion of the chassis 1 is protruded such that the predetermined portion integrally extending from the light guide plate placement portion 1a of the metallic chassis 1 is arranged in the region opposite the light entrance surface 3a of the light guide plate 3, and the protruding predetermined portion of the chassis 1 is used as the light source placement portion 1b. Thus, the placement surface 1c of the light source placement portion 1b of the chassis 1 can be raised in the Z-direction (the plate thickness direction of the light guide plate 3) with respect to the light guide plate placement portion 1a. In other words, when the light source module 5 is placed on the placement surface 1c of the light source placement portion 1b of the chassis 1, the LEDs 6 are raised in the Z-direction. Hence, even when a raising member for raising the LEDs 6 is not additionally provided, it is possible to move the LEDs 6 close to the center of the light guide plate 3 in the plate thickness direction of the light guide plate 3. Thus, it is possible to reduce variations in brightness resulting from the LEDs 6 being arranged at an end of the light guide plate 3 in the plate thickness direction of the light guide plate 3 without increasing the number of components. In this case, since it is not necessary to interpose the raising member between the chassis 1 and the light source module 5, it is possible to efficiently dissipate heat generated by the LEDs 6.

In the first embodiment, as described above, when the light source module 5 is placed on the placement surface 1c of the light source placement portion 1b of the chassis 1, the amount (the height of the protruding portion) H of raising of the placement surface 1c of the light source placement portion 1b of the chassis 1 is set such that the LEDs 6 are moved close to the center of the light guide plate 3 in the plate thickness direction of the light guide plate 3. Thus, it is possible to reduce variations in brightness.

Second Embodiment

The configuration of an illumination device 30 of a second embodiment will now be described with reference to FIG. 4.

Figure 4:
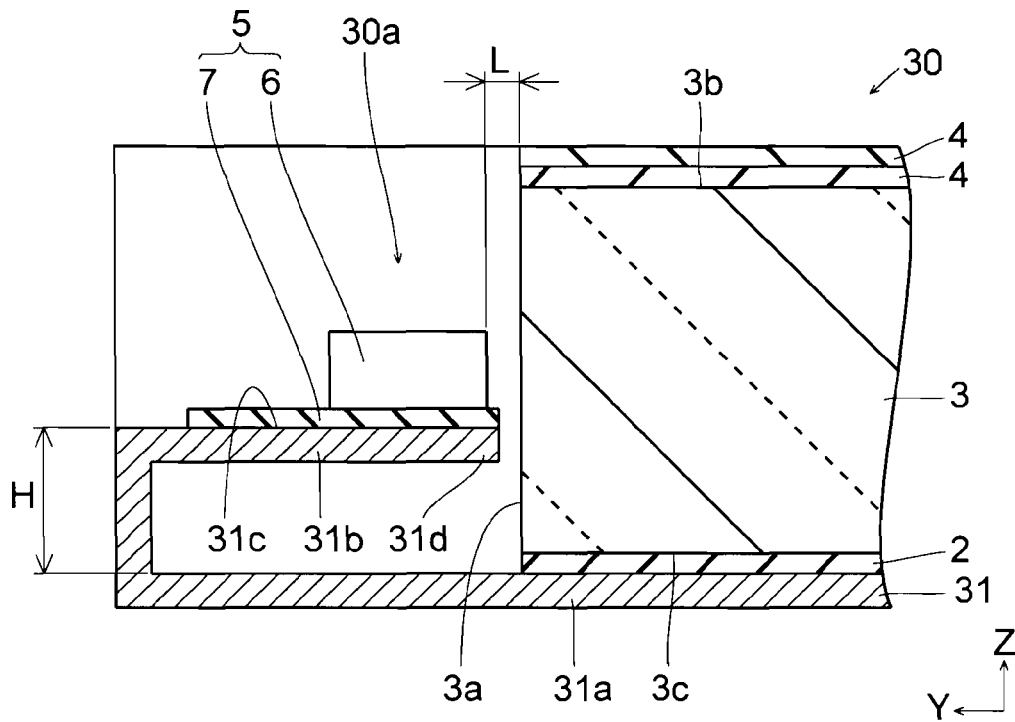
FIG. 4 An enlarged view of a light source module and its vicinity of an illumination device according to a second embodiment of the present invention.

In the illumination device 30 of the second embodiment, a chassis 31 as shown in FIG. 4 is used. In an accommodation space 30a on the bottom portion of the chassis 31, the reflective sheet 2, the light guide plate 3, the optical sheets 4 and the light source module 5 are accommodated.

This chassis 31 is obtained by processing a metal plate (for example, an aluminum plate or a stainless steel plate), and integrally includes a light guide plate placement portion 31a and a light source placement portion 31b. The light guide plate placement portion 31a of the chassis 31 is a portion on which the reflective sheet 2, the light guide plate 3 and the optical sheets 4 are placed in this order; the light source placement portion 31b of the chassis 31 is a portion on which the light source module 5 is placed. The light guide plate placement portion 31a of the chassis 31 is formed with a part of the bottom portion of the chassis 31; the light source placement portion 31b of the chassis 31 is formed with a predetermined portion integrally extending from the light guide plate placement portion 31a. The light guide plate placement portion 31a is an example of the "first placement portion" of the present invention; the light source placement portion 31b is an example of the "second placement portion" of the present invention.

In the second embodiment, the light source placement portion 31b of the chassis 31 has a placement surface 31c perpendicular to the light entrance surface 3a of the light guide plate 3, and the placement surface 31c of the light source placement portion 31b is raised in the Z-direction (the plate thickness direction of the light guide plate 3) with respect to the light guide plate placement portion 31a. Specifically, the predetermined portion integrally extending from the light guide plate placement portion 31a of the chassis 31 is folded such that the predetermined portion is arranged in a region opposite the light entrance surface 3a of the light guide plate 3; the folded predetermined portion of the chassis 31 is the light source placement portion 31b. The folded predetermined portion (which is the light source placement portion 31b) of the chassis 31 is formed such that its end (open end) 31d extends very close to the light entrance surface 3a of the light guide plate 3. The light source module 5 is placed on the placement surface 31c of the light source placement portion 31b of the chassis 31.

In the second embodiment, when the light source module 5 is placed on the placement surface 31c of the light source placement portion 31b of the chassis 31, the amount (the height of the folded portion) H of raising of the placement surface 31c of the light source placement portion 31b of the chassis 31 is set such that the LEDs 6 are moved close to the center of the light guide plate 3 in the plate thickness direction of the light guide plate 3. Hence, when the light source module 5 is placed on the placement surface 31c of the light source placement portion 31b of the chassis 31, the LEDs 6 face the vicinity of the center of the light entrance surface 3a of the light guide plate 3 in the Z-direction.

The configuration of the other portions in the second embodiment is the same as in the first embodiment.

In the second embodiment, as described above, the predetermined portion of the chassis 31 is folded such that the predetermined portion integrally extending from the light guide plate placement portion 31a of the metallic chassis 31 is arranged in the region opposite the light entrance surface 3a of the light guide plate 3, and the folded predetermined portion of the chassis 31 is used as the light source placement portion 31b. Thus, the placement surface 31c of the light source placement portion 31b of the chassis 31 can be raised in the Z-direction (the plate thickness direction of the light guide plate 3) with respect to the light guide plate placement portion 31a. In other words, when the light source module 5 is placed on the placement surface 31c of the light source placement portion 31b of the chassis 31, the LEDs 6 are raised in the Z-direction. Hence, even when a raising member for raising the LEDs 6 is not additionally provided, it is possible to move the LEDs 6 close to the center of the light guide plate 3 in the plate thickness direction of the light guide plate 3. Thus, it is possible to reduce variations in brightness resulting from the LEDs 6 being arranged at an end of the light guide plate 3 in the plate thickness direction of the light guide plate 3 without increasing the number of components. In this case, since it is not necessary to interpose the raising member between the chassis 31 and the light source module 5, it is possible to efficiently dissipate heat generated by the LEDs 6.

In the second embodiment, as described above, when the light source module 5 is placed on the placement surface 31c of the light source placement portion 31b of the chassis 31, the amount (the height of the folded portion) H of raising of the placement surface 31c of the light source placement portion 31b of the chassis 31 is set such that the LEDs 6 are moved close to the center of the light guide plate 3 in the plate thickness direction of the light guide plate 3. Thus, it is possible to reduce variations in brightness.

In the second embodiment, as described above, the end (open end) 31d of the folded predetermined portion (which is the light source placement portion 31b) of the chassis 31 is extended very close to the light entrance surface 3a of the light guide plate 3, and thus the end 31d of the light source placement portion 31b of the chassis 31 positioned on the side of the light guide plate 3 is arranged very close to the light entrance surface 3a of the light guide plate 3. Thus, it is possible to bring the light source module 5 placed on the placement surface 31c of the light source placement portion 31b of the chassis 31 close to the light entrance surface 3a of the light guide plate 3. In other words, it is possible to decrease a space L between the LEDs 6 and the light entrance surface 3a of the light guide plate 3. Since the amount of light incident on the light entrance surface 3a of the light guide plate 3 is increased in this way, it is possible to enhance the efficiency with which the light is utilized. Moreover, when the light source module 5 is placed on the placement surface 31c of the light source placement portion 31b of the chassis 31, the end 31d of the light source placement portion 31b of the chassis 31 is used as a position reference, and thus it is possible to easily place the light source module 5 in position.

Figure 5:
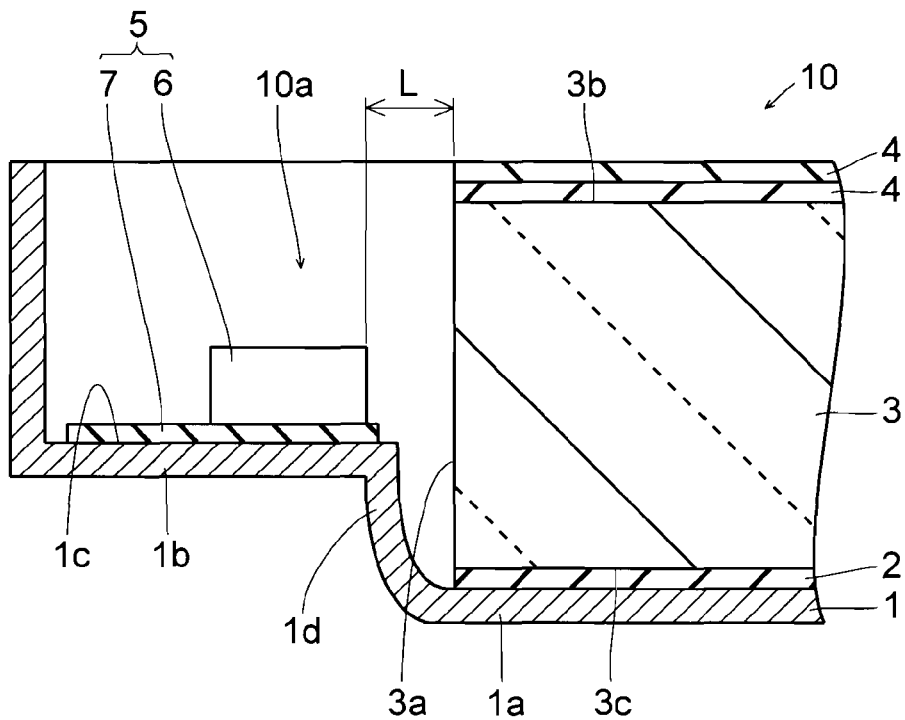
FIG. 5 A diagram illustrating the effects of the second embodiment.

In the first embodiment, since, as shown in FIG. 5, it is actually difficult to bend a junction 1d between the light guide plate placement portion 1a and the light source placement portion 1b by 90 degrees, the space L between the LEDs 6 and the light entrance surface 3a of the light guide plate 3 is greater than that in the second embodiment. Thus, it is possible to increase, in the second embodiment, the efficiency with which the light is utilized as compared with the first embodiment.

Third Embodiment

The configuration of an illumination device 40 of a third embodiment will now be described with reference to FIG. 6.

Figure 6:
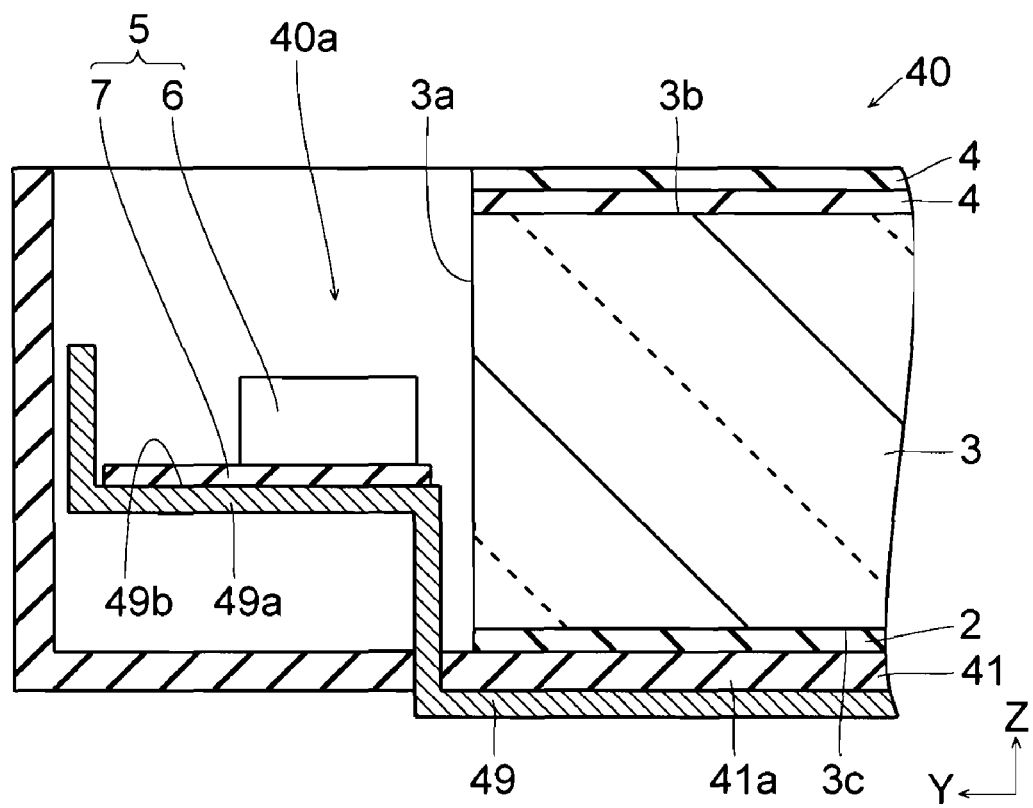
FIG. 6 An enlarged view of a light source module and its vicinity of an illumination device according to a third embodiment of the present invention.
Figure 7:
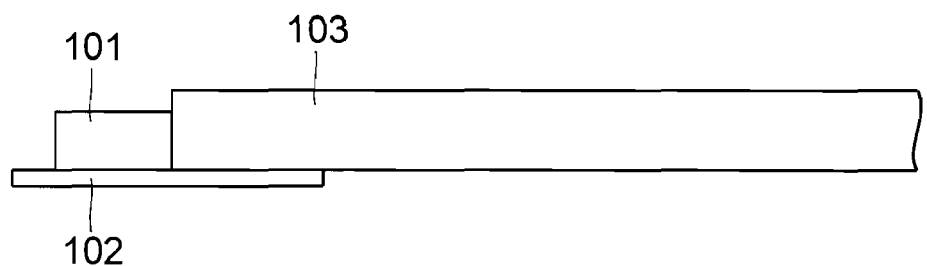
FIG. 7 A simplified view of an example of a conventional side-lit illumination device.
Figure 8:
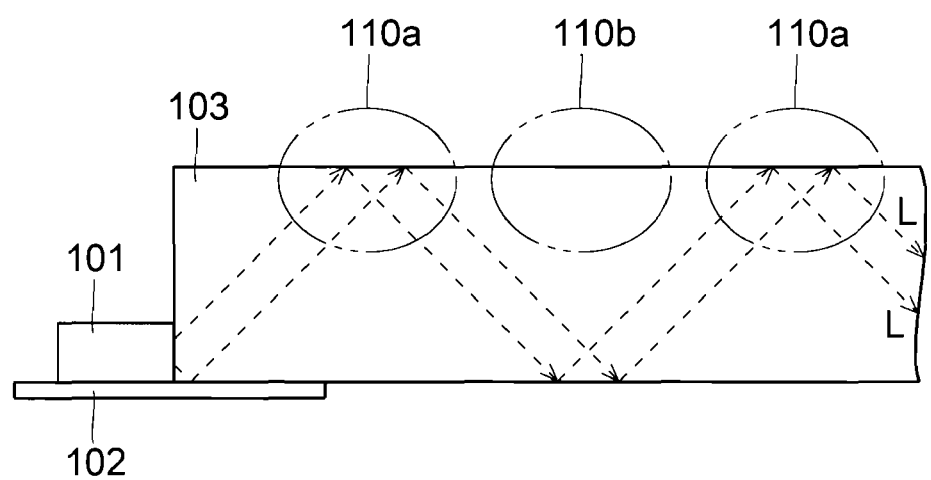
FIG. 8 A diagram illustrating a conventional problem.

As shown in FIG. 6, in the illumination device 40 of the third embodiment, an accommodation space 40a is provided on the bottom portion of a chassis 41 formed of resin. On a part 41a of the bottom portion of the chassis 41, the reflective sheet 2, the light guide plate 3 and the optical sheets 4 are placed in this order. The part 41a of the chassis 41 is an example of the "first placement portion" of the present invention; in the following description, it is referred to as a light guide plate placement portion 41a.

Here, in the third embodiment, a heat dissipation plate 49 is attached to the side of the back surface of the bottom portion of the chassis 41, and a predetermined portion of the heat dissipation plate 49 is used as a light source placement portion 49a. The light source placement portion 49a of the heat dissipation plate 49 is an example of the "second placement portion" of the present invention.

The heat dissipation plate 49 including the light source placement portion 49a is bent such that the light source placement portion 49a has a placement surface 49b perpendicular to the light entrance surface 3a of the light guide plate 3 and that the placement surface 49b of the light source placement portion 49a is raised in the Z-direction (the plate thickness direction of the light guide plate 3) with respect to the light guide plate placement portion 41a of the chassis 41. The light source module 5 is placed on the placement surface 49b of the light source placement portion 49a of the heat dissipation plate 49. The light source placement portion 49a of the heat dissipation plate 49 protrudes through a through hole formed in the bottom portion of the chassis 41 from the side of the back surface of the bottom portion of the chassis 41 to the side of the accommodation space 40a.

In the third embodiment, when the light source module 5 is placed on the placement surface 49b of the light source placement portion 49a of the heat dissipation plate 49, the amount of raising of the placement surface 49b of the light source placement portion 49a of the heat dissipation plate 49 is set such that the LEDs 6 are moved close to the center of the light guide plate 3 in the plate thickness direction of the light guide plate 3. Hence, when the light source module 5 is placed on the placement surface 49b of the light source placement portion 49a of the heat dissipation plate 49, the LEDs 6 face the vicinity of the center of the light entrance surface 3a of the light guide plate 3 in the Z-direction.

The configuration of the other portions in the third embodiment is the same as in the first embodiment.

With the illumination device 40 configured as described above and according to the third embodiment, it is possible to obtain the same effects as in the first embodiment. However, in the third embodiment, since the heat dissipation plate 49 separate from the chassis 41 is used to dissipate the heat from the LEDs 6, the number of components is increased as compared with the first embodiment.

It should be considered that the embodiments disclosed herein are illustrative in all respects and not restrictive. The scope of the present invention is indicated not by the description of the embodiments discussed above but by the scope of claims; meaning equivalent to the scope of claims and all modifications within the scope are included.

LIST OF REFERENCE SYMBOLS 1, 31, 41 Chassis
1a, 31a, 41a Light guide plate placement portion (first placement portion)
1b, 31b, 49a Light source placement portion (second placement portion)
1c, 31c, 49b Placement surface
3 Light guide plate
3a Light entrance surface
3b Light emitting surface
5 Light source module
6 LED (light emitting diode)
10, 30, 40 Illumination device
10a, 30a, 40a Accommodation space
20 Liquid crystal display panel (member to be illuminated)
31d End

The invention claimed is:

1. An illumination device comprising:
a light guide plate including at least a light entrance surface that is a predetermined side end surface and a light emitting surface that is perpendicular to the light entrance surface and that is a surface facing a member to be illuminated;
a light source module including at least a light emitting diode element arranged to face the light entrance surface of the light guide plate; and
a chassis including an accommodation space arranged to accommodate the light guide plate and the light source module wherein
a first placement portion on which the light guide plate is placed and a second placement portion on which the light source module is placed are provided in the accommodation space;
the first and second placement portions are provided such that the second placement portion includes a placement surface perpendicular to the light entrance surface of the light guide plate and that the placement surface of the second placement portion is raised in a plate thickness direction of the light guide plate with respect to the first placement portion;
the light source module is placed on the placement surface of the second placement portion;
the chassis is provided by a metallic plate and a portion of the metallic plate defines the first placement portion;
the metallic plate, which includes the first placement portion, is bent such that a predetermined portion of the metallic plate, other than the first placement portion, is raised in a plate thickness direction of the light guide plate with respect to the first placement portion;
the predetermined portion of the metallic plate, which is raised, is directly opposite to the light entrance surface of the light guide plate; and
the predetermined portion of the metallic plate defines the second placement portion.

2. The illumination device of claim 1,
wherein, when the light source module is placed on the placement surface of the second placement portion, an amount of raising of the placement surface of the second placement portion is set such that the light emitting diode element is moved close to a center of the light guide plate in the plate thickness direction of the light guide plate.

3. The illumination device of claim 1,
wherein the predetermined portion of the metallic plate which defines the second placement portion is folded such that an end of the predetermined portion is arranged to extend such that the predetermined portion is directly adjacent to the light entrance surface of the light guide plate.

4. A liquid crystal display device comprising:
the illumination device of claim 1; and
a liquid crystal display panel to which light from the illumination device is applied.

5. A liquid crystal display device comprising:
the illumination device of claim 2; and
a liquid crystal display panel to which light from the illumination device is applied.

6. A liquid crystal display device comprising:
the illumination device of claim 3; and
a liquid crystal display panel to which light from the illumination device is applied.

* * * * *